United States Patent [19]

Martin

[11] 4,329,558
[45] May 11, 1982

[54] APPARATUS AND PROCESS FOR PREVENTING RUPTURE OF THE WIRE ELECTRODE OF AN EDM TRAVELLING WIRE APPARATUS

[75] Inventor: Roland Martin, Valleiry, France

[73] Assignee: Ateliers des Charmilles, S.A., Geneva, Switzerland

[21] Appl. No.: 171,456

[22] Filed: Jul. 23, 1980

[30] Foreign Application Priority Data

Jul. 24, 1979 [CH] Switzerland ............................ 6852/79

[51] Int. Cl.³ ............................................. B23P 1/02
[52] U.S. Cl. ............................ 219/69 W; 219/69 M; 219/69 P; 315/227 A; 324/71 E; 83/74
[58] Field of Search ............... 219/69 W, 69 M, 69 C, 219/69 P, 69 R; 324/71 R, 71 E; 83/72, 74; 315/227 A

[56] References Cited

U.S. PATENT DOCUMENTS

| | | | |
|---|---|---|---|
| 3,581,045 | 5/1971 | Panschow et al. | 219/69 W |
| 3,739,136 | 6/1973 | Marendaz | 219/69 C |
| 3,997,753 | 12/1976 | Inoue | 219/69 C |
| 4,223,198 | 9/1980 | Inoue | 219/69 W |
| 4,232,208 | 11/1980 | Buhler | 219/69 W |

FOREIGN PATENT DOCUMENTS

| | | | |
|---|---|---|---|
| 52-58195 | 5/1977 | Japan | 219/69 W |
| 53-64899 | 9/1978 | Japan | 219/69 W |

*Primary Examiner*—B. A. Reynolds
*Assistant Examiner*—M. Paschall
*Attorney, Agent, or Firm*—Hauke and Patalidis

[57] ABSTRACT

An arrangement for detecting abnormal concentration of electrical discharges between a travelling wire electrode and a workpiece in a travelling wire EDM apparatus. The abnormal electrical discharge detector of the invention comprises a circuit measuring the voltage across a pair of contacts supplying machining current to the electrode wire. The length of the electrode wire between the two contacts forms a pair of variable resistors connected in a branch of a Wheatstone bridge circuit. The voltage measuring circuit, connected across a diagonal of the bridge, in turn controls some of the machining parameters such as to prevent damages, as for example rupture of the wire electrode, when an abnormal concentration of electrical discharges is detected at a given point of the machining zone between the wire electrode and the workpiece.

6 Claims, 4 Drawing Figures

APPARATUS AND PROCESS FOR PREVENTING RUPTURE OF THE WIRE ELECTRODE OF AN EDM TRAVELLING WIRE APPARATUS

BACKGROUND OF THE INVENTION

The present invention relates to a process and apparatus for electrical discharge machining a workpiece by means of an electrode tool in the form of a wire, consecutive voltage pulses being applied between the electrodes such as to trigger the electrical discharges.

In travelling wire EDM apparatus, the electrode wire and workpiece and displaced relative to each other such as to effectuate a cut through the workpiece according to a programmed path. It is convenient to supply the machining current to the machining zone between the electrode wire and the workpiece on both sides of the machining zone by means of two electrical connections each comprising a contact in engagement with the electrode wire connected to one of the terminals of the EDM pulse generators, the other terminal of the pulse generator being connected to the workpiece to be machined.

As long as electrical discharge machining is effected in a normal manner, the electrical discharges across the machining gap between the electrodes occur entirely at random. However, it has been observed that concentration of the electrical discharges may occur at a particular point of the machining zone, with the result that normal machining is disturbed and the number of abnormal electrical discharges is increased, which may cause rupture of the electrode wire due to localized excessive heating of the electrode wire. Disturbance of normal machining conditions can be avoided by rapidly modifying some of the machining parameters such as the energy of the electrical discharges, or the flow rate of the machining fluid. It is consequently advantageous to detect a localized concentration of electrical discharges in order to prevent abnormal machining.

SUMMARY OF THE INVENTION

The process of the present invention has for principal object to automatically take any preventive measure required to avoid such abnormal machining. According to the process of the present invention, an electrical signal is provided as a function of one of the electrical discharge characteristics and at least one machining parameter is modified in response to that signal, the signal being given a value representative of the location, along the active length of the electrode wire, where each electrical discharge occurs during machining.

The present invention also permits to detect the location of electrical discharge concentration, which is a very helpful bit of information for effectuating the control or correction of the machined surface of the workpiece, or an alignment between the electrode wire and the workpiece edge prior to effecting a cut. Another advantage which results from being able to determine the position of the electrical discharges is to be able to detect any variation in the height of the workpiece subjected to electrical discharge machining in order to vary some machining parameters in response to this detection, such as to maintain the machining at its maximum efficiency irrespective of the height or thickness of the workpiece.

These, and other objects of the invention, will become apparent to those skilled in the art upon reading the following description of the best mode contemplated for practicing the invention in conjunction with the accompanying drawing, illustrating an example of travelling wire EDM apparatus according to the present invention and in which:

DETAILED DESCRIPTION OF THE PREFERRED EMBODIMENT

Figure 1:
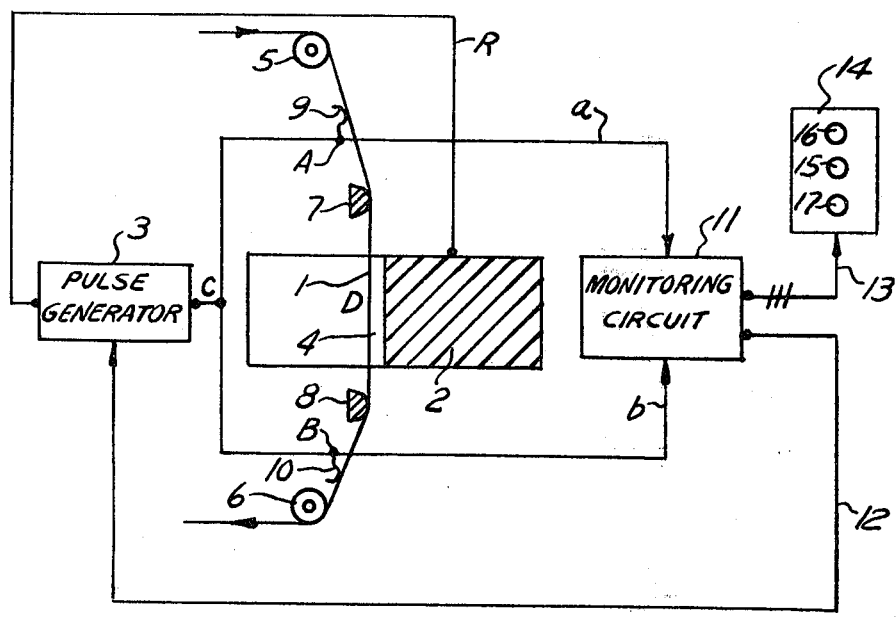
FIG. 1 illustrates schematically the principle of an EDM apparatus controlled by an arrangement measuring the position of electrical discharges occurring along a travelling wire electrode.

As schematically illustrated at FIG. 1, a travelling wire EDM apparatus comprises an electrode tool in the form of a metallic wire 1 for effecting a cut in an electrode workpiece 2 by applying between the electrodes consecutive voltage pulses supplied by a pulse generator 3, such as to cause electrical discharges to occur in a machining zone 4 formed between the electrodes.

The electrode wire 1 is longitudinally displaced through the machining zone 4, in the direction of the arrows for example, by being fed over the pulleys 5 and 6 and being stretched between the guide and support members 7 and 8. Those elements, well known in the travelling wire EDM art, form part of a movable electrode wire support assembly, not shown, and the electrode wire 1 is obtained from an appropriate supply spool and is fed along its longitudinal axis by means also well known and not shown The electrode wire guide and support members 7 and 8, and consequently the electrode wire 1, and the workpiece 2 are displaced relative to each other by means of appropriate servo motors controlled according to a predetermined programmed path by an appropriate numerical control. The machining current flowing through the machining zone 4 is fed to the wire 1 by a pair of sliding contacts 9 and 10, each disposed on one side of the machining zone and each connected to a common terminal C of the pulse generator 3 by lines AC and BC, the other terminal of the pulse generator 3 being connected directly to the workpiece 2 by a return line R.

A monitoring circuit 11 is connected across the sliding contacts 9 and 10 by lines a and b and, after processing the information received on the lines a and b, the monitoring circuit 11 supplies a signal, at one of its outputs, which is applied to the pulse generator 3 through a line 12. The monitoring circuit 11 is arranged to also provide a plurality of additional input signals, through a plurality of lines 13, to an optical display device 14 comprising a plurality of optical indicators, as schematically represented at 15, 16 and 17, such as light bulbs or light emitting diodes.

Figure 2:
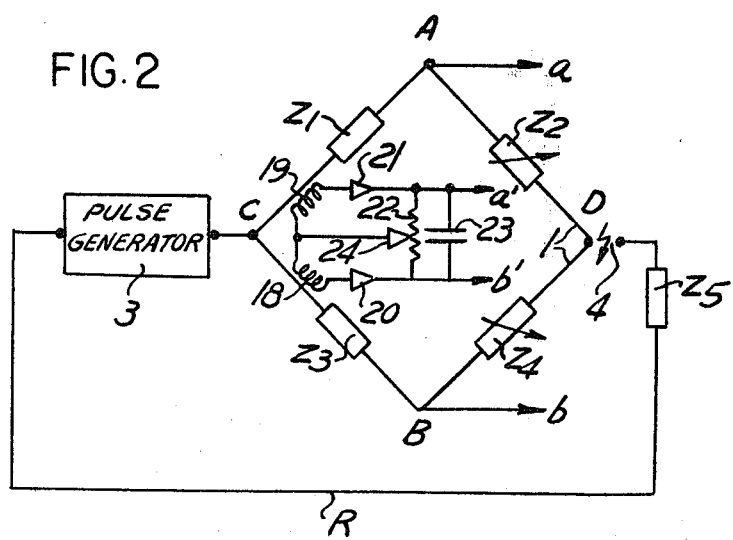
FIG. 2 is an electrical schematic of a portion of the circuit of FIG. 1.

FIG. 2 illustrates schematically an equivalent circuit to that connecting the pulse generator 3 to the machining zone 4. When an electrical discharge occurs at any point of the machining zone 4, the machining current pulse flows through two parallel circuits CAD and CBD. The circuit CAD has an impedance Z1 in its portion CA and an impedance Z2 in its portion AD. The parallel circuit CBD has an impedance Z3 in its portion CB and an impedance Z4 in its portion BD. The impedances Z1 and Z3 each have a constant value, while the impedances Z2 and Z4 have each a differential value depending on the length AD of the electrode wire 1 between the point D of discharge and the terminal A of the contact 9 and the length BD of the electrode wire between the point D and the terminal B of the contact 10. The four impedances Z1, Z2, Z3 and Z4 form a Wheatstone bridge whose amount of unbalance depends upon the position of the discharge, or position of the point D, in the machining zone 4. After flowing through the machining zone 4, the current returns to the pulse generator 3 via the return line R having an impedance Z5. If the impedances Z1 and Z2 are equal and if the contacts 9 and 10 are situated at equal distances from the machining zone 4, the bridge is balanced if an electrical discharge occurs at the middle of the machining zone 4 and no voltage appears across the diagonal branch of the bridge at terminals A and B in the course of the electrical discharge. However, if an electrical discharge occurs at any point D other than at the middle of the machining zone 4, the values of the impedances Z2 and Z4 are no longer equal and the bridge is unbalanced. A voltage appears across the diagonal branch terminals A and B, and the level of the voltage is proportional to the location of the point D along the length of wire 1 in the machining zone 4 at which the electrical discharge took place.

An alternative arrangement for determining the balance and unbalance of the Wheatstone bridge consists, as illustrated at FIG. 2, in measuring the current flowing through the two parallel circuit branches CAD and CBD of the bridge by means of a pair of current transformers 18 and 19 whose secondary windings are each connected in series with one of a pair of diodes 20 and 21 such as to form a current rectifying bridge. The output current, after flowing through a potentiometer 22, charges a capacitor 23 across which, at terminals a' and b', there appears a voltage representative of the difference between the currents flowing through the secondary windings of the transformers 18 and 19. The slider 24 of the potentiometer 22, which is connected to the common terminal of the secondary windings of the transformers 18 and 19, permits to pre-balance the current rectifying bridge without regard to whether or not the workpiece 2 is disposed at mid-distance between the sliding contacts 9 and 10 supplying the voltage pulses to the electrode wire 1.

Measuring the unbalance of the Wheatstone bridge directly across the diagonal terminals A and B by means of the lines a and b presents the advantage of being independent of the voltage of each electrical discharge between the electrode wire and the workpiece, and of determining the position of the discharge either in the upper half or lower half of the machining zone according to the value and polarity of the voltage, or in the middle of the machining zone when the bridge is balanced.

If determining the balance and measuring the amount of unbalance of the bridge is effected through the lines a' and b' across the capacitor 23, the measured voltage is representative not only of the location of the electrical discharge, but also of the level of the machining current, such that the monitoring circuit 11, FIG. 1, must introduce a correction factor as a function of the machining current level. The monitoring circuit 11 provides a visual display of the location of the maximum concentration of electrical discharge by means of the visual indicators 15, 16 and 17 indicating respectively a maximum concentration of electrical discharges in the middle, at the top or at the bottom of the machining zone. In addition, a signal representative of the concentration of electrical discharges is provided on the line 12 for controlling the output of the pulse generator 3, for example by decreasing the energy of the electrical discharges until a random occurrence of electrical discharges is re-established, which permits to maintain optimum machining conditions and to avoid rupture of the electrode wire.

The signals at the output of the monitoring circuit 11 can also be used for varying another machining parameter affecting the concentration of the electrical discharges, such as, for example, the flow rate of the machining fluid. The signals at the output of the monitoring circuit could also be used to vary the obliquity of the wire relative to the surface of the workpiece.

Other means could be used for measuring the instantaneous current in each branch of the bridge of FIG. 2, such as for example Hall-effect transistors.

Another application of the arrangement of FIG. 1 and 2 takes the form of an effective machining monitor operating to detect an error in the alignment of the electrode wire relative to its support and guide members during a cut in the workpiece. The machined surface of the workpiece may take a convex or concave shape which is detected as a result of an abnormal electrical discharge concentration during a control phase in the course of which the cutting path is repeated after having effected a cut in the workpiece according to the programmed path.

Figure 3:
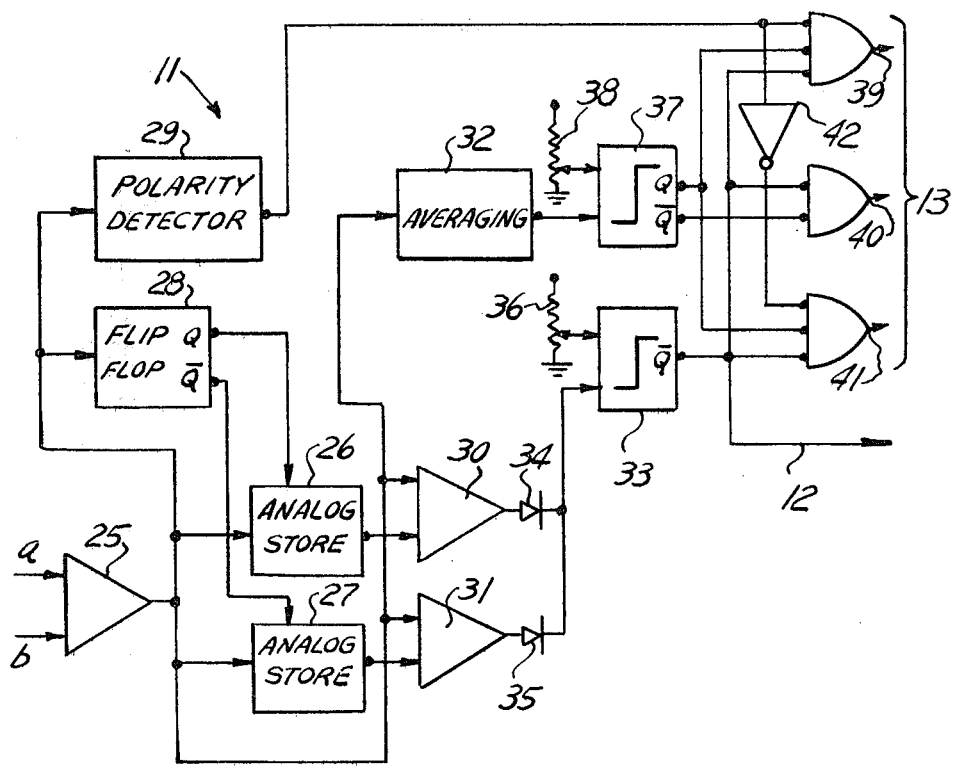
FIG. 3 is a block diagram of another portion of the circuits of FIG. 1.

The monitoring circuit 11 can take, for example, the form schematically illustrated in the block diagram of FIG. 3, for signaling and determining the location of electrical discharges concentration.

The voltage across lines a and b, or across lines a' and b' of FIG. 2, is applied to the inputs of a differential amplifier or comparator 25 whose output is connected to two analog memory storages 26 and 27 and to a flip-flop 28 having an output Q connected to the analog memory storage 26 and an output $\overline{Q}$ connected to the analog memory storage 27. The output of the differential amplifier 25 is also connected to a polarity detecting circuit 29. The outputs of the analog memory storages 26 and 27 are connected respectively to one of the inputs of two differential amplifiers or comparators 30 and 31, the other input of each of the comparators 30 and 31 being also connected to the output of the differential amplifier or comparator 25. In addition, the output of the comparator 25 is applied to an averaging circuit 32. The two comparators 30 and 31 have their outputs connected to one of the inputs of a trigger 33 through diodes 34 and 35, the other input of the trigger 33 being held at a voltage supplied by a potentiometer 36.

Another trigger 37 accepts at one of its inputs the average voltage supplied at the output of the averaging circuit 32 and at its other input a voltage reference obtained from a potentiometer 38.

The logic signal appearing at the output $\overline{Q}$ of the trigger 33 is applied to one of the inputs of each of three AND gates 39, 40 and 41, while the logic signal at the output $\overline{Q}$ of the trigger 37 is connected to the second input of the AND gate 40, and the signal appearing at the output Q of the trigger 37 is applied to one of the inputs of each of the AND gates 39 and 41. The AND gate 39 has a third input to which is applied the signal at the output of the polarity detector circuit 29, and that signal is also applied to a third input of the AND gate 41 through an inverter 42.

The circuit of FIG. 3 functions as follows:

The voltage representing the amount of unbalance of the Wheatstone bridge of FIG. 2, i.-e. the position of each electrical discharge in the machining zone 4, is stored alternatively by the analog memory storages 26 and 27 as controlled by the logic level signal at the output Q and Q̄ of the flip-flop 28. Each stored voltage value is compared to the voltage value of the immediately preceding discharge by the comparator 30 or 31, such that the two comparators 30 or 31 determine alternatively the difference in voltage level between two consecutive discharges. The difference which is applied, either through the diode 34 or the diode 35, to an input of the trigger 33 is compared by the trigger to the voltage reference supplied by the potentiometer 36, such that the output Q̄ of the trigger 33 provides a signal on the line 12 when the difference is less than the reference value supplied by the potentiometer 36, therefore giving an indication of an abnormal rate of electrical discharge concentration. An indication of an abnormal rate of electrical discharge concentration could also be obtained by using another type of circuit such as for example illustrated at FIG. 5 of U.S. Pat. No. 3,739,136.

The trigger 37 in turn provides a signal at its output Q when the average level of the pulses causing an unbalance of the Wheatstone bridge is greater than the reference level established by the potentiometer 38, which is an indication that electrical discharges are concentrated outside of the machining zone. The polarity signal appearing at the output of the polarity detector circuit 29 and of the inverter 42 permits to identify the position of the electrical discharge concentration either at the top or at the bottom of the machining zone according to whether the gate 39 or the gate 41 is enabled by the signal at the output of the polarity detector 29. If the electrical discharges are concentrated at the middle of the machining zone, the average level of the pulses is lower than the level set by the potentiometer 38, and the output Q̄ of the trigger 37 enables the AND gate 40.

However, in the event that the electrical discharges appear at random in the machining zone, which is an indication of normal operation, no signal appears at the output Q̄ of the trigger 33, and the three AND gates 39, 40 and 41 are inhibited.

If the detection of the unbalance of the Wheatstone bridge of FIG. 2 is obtained by means of a pair of current transformers, such as the current transformers 18 and 19, the reference voltage supplied by the potentiometer 36 must be adjusted as a function of the total machining current level, such as to cause the measuring of the amount of unbalance of the bridge to be independent of that level.

Figure 4:
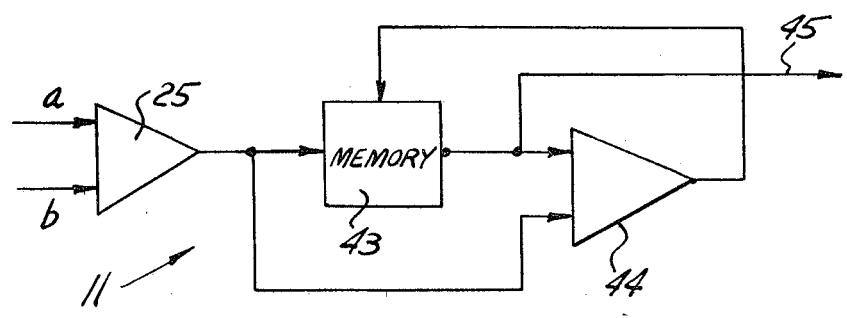
FIG. 4 is a block diagram of a modification thereof.

Another example of monitoring circuit 11 is illustrated at FIG. 4, in the event that it is desired to provide an indication of the maximum value of the signal representing the unbalance of the bridge, such a maximum value being proportional to the height of the active surface of the workpiece being machined.

In the example of circuit of FIG. 4, the output of the differential amplifier or comparator 25 is connected to the input of a memory storage or register 43 and to one of the inputs of a differential amplifier or comparator 44. The other input of the comparator 44 is connected to the output of the memory storage 43. The output of the comparator 44 controls the loading of the memory storage 43, only when the level at the output of the comparator 25 is higher than the level stored in the memory storage 43. Therefore, the voltage level transmitted by a line 45 connected to the output of the memory storage 43 corresponds to the maximum level at the output of the differential amplifier 25 and represents an indication of the height of the workpiece, which can be used in a well known manner for modifying one or more machining parameters, such as for example the output power of the pulse generator.

The electrical discharge position could also be determined by providing the current pulses supplied by the pulse generator 3 of FIG. 1 with a predetermined amplitude. Under such conditions, the connection between the common terminal C of the pulse generator 3 and the terminal A of the sliding contact 9 can be omitted, because the voltage drop between the contacts 9 and 10 in the course of an electrical discharge provides a determination of the position D of the discharge in the machining zone 4.

Having thus described the present invention by way of structural examples thereof given for illustrative purpose, modifications whereof will be apparent to those skilled in the art, what is claimed as novel is as follows:

1. In an apparatus for EDM machining an electrode workpiece by an electrode tool in the form of a travelling wire in a machining zone between a supported length of said travelling wire and a surface of said workpiece, said apparatus comprising a voltage pulse generator having an output terminal connected to said workpiece and another output terminal connected to said wire by two separate circuits, one of said circuits connecting said output terminal to a sliding contact in engagement with said wire on one side of said machining zone and the other circuit connecting said terminal to a sliding contact engaged with said wire on the other side of said machining zone, said first and second circuits forming two branches of a Wheatstone bridge, the other two branches of which are formed one by a portion of said electrode wire between the first of said sliding contact and the point of occurrence of an electrical discharge and the other by a portion of said wire between said second contact and said point of occurrence of said electrical discharge, the improvement comprising means for measuring the unbalance of said bridge during each electrical discharge, and means controlled by said last mentioned means for adjusting at least one machining parameter such as to cause continuous unbalance of said bridge from one of said electrical discharges to the next, wherein said means for measuring the unbalance of said bridge comprises comparator means connected across a diagonal of said bridge for providing an output signal having an amplitude proportional to the unbalance of said bridge for each of said electrical discharges, means for storing the amplitude of said signals, means for comparing consecutive stored amplitudes and means for controlling said adjusting means when a difference in said amplitudes less than a reference value is detected.

2. The improvement of claim 1 wherein the means adjusting at least one machining parameter comprises means controlling said voltage pulse generator for momentarily reducing said voltage pulses until said unbalance is re-established.

3. The improvement of claim 1 further comprising means for detecting the extreme amplitude values of said output signal, and means for storing said extreme values as a representation of the height of the workpiece in the course of a machining operation.

4. In a process for EDM machining an electrode workpiece by an electrode tool in the form of a travelling wire in a machining zone between a supported length of said travelling wire and a surface of said workpiece, said process comprising applying voltage pulses across an output terminal connected to said workpiece and another output terminal connected to said wire by two separate circuits, one of said circuits connecting said output terminal to a sliding contact in engagement with said wire on one side of said machining zone and the other circuit connecting said terminal to a sliding contact engaged with said wire on the other side of said machining zone, said first and second circuits forming two branches of a Wheatstone bridge, the other two branches of which are formed one by a portion of said electrode wire between the first of said sliding contact and the point of occurrence of an electrical discharge and the other by a portion of said wire between said second contact and said point of occurrence of said electrical discharge, the improvement comprising measuring the unbalance of said bridge during each electrical discharge, and adjusting at least one machining parameter such as to cause continuous unbalance of said bridge from one of said electrical discharges to the next, wherein the unbalance of said bridge is measured by providing an output signal having an amplitude proportional to the unbalance of said bridge for each of said electrical discharges, storing the amplitude of said signals, measuring the difference between consecutive stored amplitudes, comparing said difference with a reference value, and adjusting said machining parameter when said difference is less than said reference value.

5. The process of claim 4 wherein the step of adjusting at least one machining parameter comprises controlling said voltage pulse generator for momentarily reducing said voltage pulses until said unbalance is reestablished.

6. The process of claim 4 further comprising detecting the extreme amplitude values of said output signal, and storing said extreme values as a representation of the height of the workpiece in the course of a machining operation.

* * * * *